United States Patent
Ferrari et al.

(10) Patent No.: US 9,617,185 B2
(45) Date of Patent: Apr. 11, 2017

(54) ACCELERATING ADMIXTURE FOR CEMENTITIOUS COMPOSITIONS

(71) Applicant: MAPEI S.P.A., Milan (IT)

(72) Inventors: Giorgio Ferrari, Milan (IT); Vincenzo Russo, Milan (IT); Marco Squinzi, Milan (IT)

(73) Assignee: MAPEI S.P.A., Milan (IT)

( * ) Notice: Subject to any disclaimer, the term of this patent is extended or adjusted under 35 U.S.C. 154(b) by 0 days.

(21) Appl. No.: 15/102,635

(22) PCT Filed: Dec. 5, 2014

(86) PCT No.: PCT/EP2014/076708
§ 371 (c)(1),
(2) Date: Jun. 8, 2016

(87) PCT Pub. No.: WO2015/086453
PCT Pub. Date: Jun. 18, 2015

(65) Prior Publication Data
US 2016/0318802 A1    Nov. 3, 2016

(30) Foreign Application Priority Data

Dec. 10, 2013  (IT) .............................. MI2013A2059

(51) Int. Cl.
| | | |
|---|---|---|
| *C04B 24/26* | (2006.01) | |
| *C04B 28/04* | (2006.01) | |
| *C04B 28/18* | (2006.01) | |
| *C04B 40/00* | (2006.01) | |
| *C04B 7/02* | (2006.01) | |
| *C04B 14/28* | (2006.01) | |
| *C04B 22/00* | (2006.01) | |
| *C04B 24/24* | (2006.01) | |
| *C08G 65/333* | (2006.01) | |
| *C08G 65/335* | (2006.01) | |
| *C04B 103/14* | (2006.01) | |
| *C04B 103/00* | (2006.01) | |
| *C04B 103/12* | (2006.01) | |
| *C04B 103/40* | (2006.01) | |

(52) U.S. Cl.
CPC ............ *C04B 24/2647* (2013.01); *C04B 7/02* (2013.01); *C04B 14/28* (2013.01); *C04B 22/0093* (2013.01); *C04B 24/246* (2013.01); *C04B 28/04* (2013.01); *C04B 28/18* (2013.01); *C04B 40/0039* (2013.01); *C08G 65/3353* (2013.01); *C08G 65/33306* (2013.01); *C04B 2103/0053* (2013.01); *C04B 2103/12* (2013.01); *C04B 2103/14* (2013.01); *C04B 2103/408* (2013.01); *Y02W 30/92* (2015.05); *Y02W 30/94* (2015.05)

(58) Field of Classification Search
CPC ....... C04B 24/2647; C04B 7/02; C04B 14/28; C04B 22/0093; C04B 24/246; C08G 65/33306; C08G 65/3353
See application file for complete search history.

(56) References Cited

U.S. PATENT DOCUMENTS

| | | | |
|---|---|---|---|
| 2013/0078519 A1* | 3/2013 | Kojima | ................... C01B 33/32 |
| | | | 429/221 |
| 2013/0183584 A1* | 7/2013 | Kojima | ................... C01B 33/32 |
| | | | 429/220 |

FOREIGN PATENT DOCUMENTS

| | | |
|---|---|---|
| DE | 19726670 A1 | 12/1998 |
| GB | 865860 A | 4/1961 |
| GB | 1340377 A | 12/1973 |
| WO | 2010026155 A1 | 3/2010 |
| WO | 2010102675 A1 | 9/2010 |
| WO | 2011104347 A1 | 9/2011 |

OTHER PUBLICATIONS

Search Report and Written Opinion of PCT/EP2014/076708 of Apr. 8, 2015.

\* cited by examiner

*Primary Examiner* — John Uselding
(74) *Attorney, Agent, or Firm* — Silvia Salvadori, P.C.; Silvia Salvadori

(57) ABSTRACT

The present invention describes a hardening accelerating admixture for hydraulic binders, the accelerator being based on transition metal silicate hydrates having the general formula: $aMe_xO_y$ $bMO$ $cAl_2O_3$ $SiO_2$ $dH_2O$ 1) where—Me represents a transition metal whose molar coefficient a is in a range between 0.001 and 2, preferably between 0.01 and 1; —M represents an alkaline earth metal whose molar coefficient b is in a range between 0 and 2, preferably between 0.3 and 1.6; —The molar coefficient c for $Al_2O_3$ is in a range between 0 and 2, preferably between 0.1 and 1; —$H_2O$ represents the hydration water of the silicate hydrate whose molar coefficient d can vary within a wide range between 0.5 and 20; x and y can both be equal to 1 or different, depending on the valence of the transition metal, given that the valence of the oxygen atom in the metal oxide is equal to 2.

19 Claims, 5 Drawing Sheets

Figure 1. Particle-size distribution of the Cu-S-H dispersion of Example 1, before the high-pressure homogenization treatment. No particles with a diameter below 1,000 nm are observed.

Figure 2. Particle-size distribution of the Cu-S-H dispersion of Example 2, after the high-pressure homogenization treatment.

Figure 3. Particle-size distribution of the Cu-S-H dispersion of Example 3, after the ultra-high-shear mixing treatment.

Figure 4. Particle-size distribution of the Cu-S-H dispersion of Example 4, after the ultrafiltration treatment.

Figure 5. Particle-size distribution of the calcium and copper silicate hydrate dispersion of Example 5-4, after the high-pressure homogenization treatment.

Figure 6. Heat of hydration of cement pastes containing the accelerators described in the Examples 5-1, 5-4 and 5-7 (Example 14).

Figure 7. Heat of hydration of a cement pastes containing the accelerator described in the Example 5-10 (Example 14).

Figure 8. High-pressure water penetration test (Example 18) in a concrete specimen prepared using the accelerator described in Example 5-10.

Figure 9. High-pressure water penetration test in a concrete specimen prepared without the accelerator described in Example 5-10 of the present invention (Example 19).

ACCELERATING ADMIXTURE FOR CEMENTITIOUS COMPOSITIONS

This application is a U.S. national stage of PCT/EP2014/076708 filed on 5 Dec. 2014, which claims priority to and the benefit of Italian Application No. MI2013A002059 filed on 10 Dec. 2013, the contents of which are incorporated herein by reference in their entireties.

BRIEF DESCRIPTION OF THE INVENTION

The present invention concerns the use of transition metal silicate hydrates as setting and hardening accelerator for hydraulic binders and the method for its manufacturing. The transition metal silicate hydrates is obtained by reaction in alkaline conditions (step 1) of a silicon-containing compound with a transition-metal-containing compound, possibly in the presence of an alkaline-metal-containing compound and an aluminum-containing compound, and subsequently (step 2) by treatment of the resulting silicate hydrate suspension with a device for the reduction of solid particles to nanometer size. The process is conducted in the presence of water-soluble dispersants selected from: i) polyethercarboxylate comb polymers, possibly containing phosphonic and/or sulfonic groups, ii) phosphonic derivatives of polyoxyalkylenes or mixtures of the above. Depending on the type of transition metal and the synthesis conditions, the hardening accelerator of the invention can be obtained in the liquid form or directly as a solid. In addition to affording an accelerating effect on cementitious compositions, the admixture improves their durability and can be suitably employed in solidification/stabilization processes with hydraulic binders to reduce leaching of contaminants from soil or sediments.

BACKGROUND OF THE INVENTION

Hardening accelerators are admixtures that are widely used in construction to increase the mechanical strength of cementitious mixes at early curing times. The need for their use arises from the demand of a quicker formwork turnover or from the requirement of reducing construction times when the concrete elements are subject to very heavy loads within a few days of placement. The use of hardening accelerators is most common in cold geographical areas or seasons. Low temperatures slow down cement hydration and this implies longer curing times to gain the compressive strength necessary for self-standing structures. Hardening accelerators boost compressive strength at early curing time because they speed up cement hydration without affecting the total amount of cement that reacts with water at longer hydration times, thus leaving unchanged the final compressive strength of the material and its durability. It is known that many inorganic compounds, such as chlorides, fluorides, carbonates, nitrates, nitrites, thiosulfates, and thiocyanates have accelerating properties. Organic accelerating compounds include triethanolamine, diethanolamine, urea, glyoxal, and formates. Chlorides and nitrates, more specifically calcium chloride and calcium nitrate, are among the most effective accelerators; unfortunately, these compounds favor corrosion of rebar and their use is therefore precluded for reinforced concrete. Calcium formate is not harmful to rebar and it acts as a hardening accelerator when it is added in a small percentage with respect to the cement weight. The main drawback of calcium formate, though, is its low solubility in water, which makes it difficult to use it as a solution; it is then necessary to add it as a powder with some practical difficulties arising from the typical fineness of its dust. Organic molecules, such as triethanolamine, act as accelerators for cement hydration at low doses (0.025% with respect to cement), while they show retarding properties at higher doses (0.06% with respect to cement). The mechanism of action of accelerators is not yet clear, but it is assumed that they accelerate the hydration of $C_3S$ through surface adsorption, ion chelation, precipitation of insoluble salts and modification of the microstructure of hydrated phases. A wide review of scientific and patent literature on the subject can be found in Collepardi, M., "Scienza e Tecnologia del Calcestruzzo", Hoepli Ed., Milano, 1987, 335-337, in Ramachandran, V. S., "Concrete Admixtures Handbook—Second edition", Noyes Publications, Park Ridge, N.Y., 1995, 185-273 and 1047-1049 and Cheung, J. et al., "Impact of Admixtures on the Hydration Kinetics of Portland Cement", Cement and Concrete Research, 41, 2011, 1289-1309. The accelerating effect is mainly exerted on the silicon-containing phases of cement and, in particular, on tricalcium silicate, $3CaO.SiO_2$, the most important component of portland cement. The importance of tricalcium silicate, indicated in cement chemistry as $C_3S$ ($C=CaO$, $S=SiO_2$), is due both to the fact that it is the most abundant component of portland cement (50-70%) and to its contribution to hardening of the cement paste. It is in fact thanks to the reaction of $C_3S$ with water that cement hardens and changes, within a few hours, from a plastic pourable mass to a solid conglomerate that can withstand great mechanical strain. The hydration reaction of tricalcium silicate can be written as:

$$C_3S+(3-x+y).H_2O \rightarrow (3-x).Ca(OH)_2+C_xSH_y.$$

The product formed by hydration of tricalcium silicate, calcium silicate hydrate, is an amorphous compound of undetermined composition, in which the proportion between the different constituents ($C=CaO$, $S=SiO_2$, $H=H_2O$) varies depending on curing time and conditions. For this reason and because of the lack of a well-defined crystal structure, this compound is generally indicated as "calcium silicate hydrate gel," with the notation C—S—H. C—S—H is a porous product that covers the cement grains and is characterized by a great surface: it is present as a bundle of fibrous particles of a few microns in length and some tenths of micron of thickness, whose intertwining contributes to determining the binding properties of cement. It is reported in the literature that C—S—H itself can act as a hardening accelerator for $C_3S$ (Kondo, R., Daimon, M., J. Am. Ceram. Soc. 52, 1969). The findings of Kondo et al. have recently been confirmed using synthetic C—S—H (Thomas, J. J. et al., J. Phys. Chem., 113, 2009, 4327-4334). It was demonstrated that adding C—S—H to a portland cement paste serves as a crystallization source for the C—S—H produced during the hydration of $C_3S$, thus accelerating nucleation and precipitation both on cement grains and in the pore solution. This phenomenon has a beneficial effect on the development of early mechanical strength and on durability of hardened conglomerates. WO2010026155 describes a process for the production of C—S—H used as a hardening accelerator, in which precipitation of calcium silicate hydrate from aqueous solutions containing calcium and silicate ions is obtained in the presence of a superplasticizing grafted polymer (comb polymer) for hydraulic binders. WO2011026720 describes a process for the production of C—S—H used as a hardening accelerator, in which precipitation of calcium silicate hydrate from aqueous solutions containing calcium and silicate ions is obtained in the presence of a polycondensated polymer containing both aromatic or heteroaromatic structural units bearing polyether side chains and aromatic or heteroaromatic units bearing phosphate groups. WO2011026723 describes a process for the production of C—S—H used as a hardening accelerator, in which precipitation of calcium silicate hydrate from aqueous solutions containing calcium and silicate ions is obtained in the presence of an aqueous solution of a water-soluble polymer containing sulfonic and aromatic groups. WO201104347 describes a process for the production of C—S—H used as a hardening accelerator, in which precipitation of calcium silicate hydrate from aqueous solutions containing calcium and silicate ions is obtained in the presence of a water-soluble dispersant containing at least one polyoxyethylene structural unit with a terminal functional group capable of acting as an anchor group on the surface of cement particles.

DESCRIPTION OF THE INVENTION

The present invention concerns the use of transition metal silicate hydrates as setting and hardening accelerating admixtures for hydraulic binders and the method for its manufacturing. Surprisingly, it was found that transition metal silicate hydrates are particularly effective as setting and hardening accelerators for hydraulic binders. The transition metal silicate hydrates are obtained by reaction in alkaline conditions (step 1) of a silicon-containing compound with a transition-metal-containing compound, possibly in the presence of an alkaline-earth-metal-containing compound and an aluminum-containing compound, and subsequently (step 2) by treatment of the resulting silicate hydrate suspension with a device for the reduction of solid particles to nanometer size. Surprisingly, it was also found that, depending on the synthesis conditions, it is possible to obtain the admixture of the invention either as a liquid suspension or as a water-dispersible gel without the need for further drying or evaporation of the product. The liquid form has the advantage of being easily dosed through volumetric dispensers such as, for example, those used in precast concrete plants. The water-dispersible gel, which could be packaged in suitable containers, can easily be introduced into the cement mixer to turn a normal ready-mixed concrete into a fast-hardening concrete. Very often, in fact, and especially in very hot climates and with long distances between the construction site and the ready-mixed plant, it is convenient to use retarding admixtures to keep the desired workability of the concrete until the truck has reached its final destination. However, if on one hand retarding admixtures can solve the problem of workability conservation, on the other hand they slow down the development of mechanical strength of the concrete resulting in a delay in formwork removal and ultimately in the execution time of the construction job. Surprisingly, it was found that the invention allows the instant neutralization of the retarding effect of admixtures and to re-establish normal cement hydration and fast development of mechanical strength. In this case it is preferable to use the transition metal silicate hydrates in the water-dispersible gel form, possibly packaged in water-soluble plastic bags, and add them in the proper dosage to the concrete in the mixer right before placing. Moreover, thanks to its particular mechanism of action, the accelerator of the invention favors a more homogeneous hydration of cement and improves the microstructure of the final conglomerate and ultimately all of the properties of the hardened material. Finally, the accelerator of the invention is able to improve the hydration reaction of cement at long curing times when this reaction is inhibited or retarded by the presence of either inorganic or organic interfering chemical species.

Transition metal silicate hydrates are commonly found in nature. Natural transition metal silicate hydrates include the following compounds:

Manganese-based silicate hydrates: Santaclaraite $CaMn_4[Si_5O_{14}OH]OH.H_2O$, Shafranovskite $(Na,K)_6(Mn,Fe)_3, Si_9O_{24}.6H_2O$, Zakarovite $Na_4Mn_5Si_{10}O_{24}(OH)_6.6H_2O$;

Copper-based silicate hydrates: Plancheite $Cu_8(Si_8O_{22})(OH)_4.H_2O$, Stringhamite $CaCu(SiO_4).H_2O$, Chrysocolla $Cu_2(H_2Si_2O_5)(OH)_4.nH_2O$;

Zinc-based silicate hydrates: Hemimorphite $Zn_4Si_2O_7(OH)_2.H_2O$, Zincsilite $Zn_3(Si_4O_{10})(OH)_2.4H_2O$, Sauconite $Na_{0.3}Zn_3[(Si,Al)_4O_{10}](OH)_2.4H_2O$;

Vanadium-based silicate hydrates: Cavansite $Ca(VO)Si_4O_{10}.4H_2O$, Saneroite $Na_2(Mn,Mn)_{10}Si_{11}VO_{34}(OH)_4$;

Zirconium-based silicate hydrates: Umbite $K2(Zr,Ti)Si_3O_9.H_2O$.

Many transition metal silicate hydrates can be synthesized by sol-gel processes by reaction in aqueous solution of soluble transition metal compounds with soluble silicon compounds. Copper silicate hydrates similar to Chrysocolla have been obtained by sol-gel processes, by reaction of copper and silicon compounds in aqueous alkaline-pH solutions (Hariu, T et al., "*Journal of Mineralogical and Petrological Science*, Volume 108, 2013, 111-115). Other examples of transition metal silicate hydrates obtained via sol-gel processes are described in U.S. Pat. No. 6,620,516, in which copper and nickel salts react with sodium silicate in the presence of anionic water-soluble polymers to afford hybrid silicate hydrates useful as highly hydrophilic coatings. DE 19726670 describes the preparation and use of an amorphous zinc silicate, possibly containing other transition metals, used as catalyst for the production of hydroxylated compounds starting from alkynes or allenes. GB 1340377 describes a process for the preparation of copper silicate from aqueous solutions of an alkaline silicate and a copper salt at high temperature, used as an antifouling agent for marine paints. GB 856860 discloses a self-hardening acid-resistant water glass cement capable of swelling that may also include a calcium-aluminum-iron silicate in a sintered and finely ground form to improve the resistance of the binder to the action of alkaline agents. WO 2010102675 describes compositions in which iron-containing hydrates are formed by reaction in water of calcium oxide, silica and iron contained in crushed concrete rubble and Linz-Donawitz (LD) slag.

Among the transition metal silicates used, for the purpose of the invention, as setting and hardening accelerators for hydraulic binders, it is possible to cite, as an example, silicate hydrates of manganese, iron, chromium, cobalt, nickel, zinc, vanadium and copper. These compounds, variously hydrated, can be composed of silicon, oxygen and just one transition metal, or they could be of mixed type and contain in addition to a transition metal also other metals, such as calcium, magnesium, aluminum and alkaline metals. Moreover, more than one transition metal may be present in the same silicate hydrate. The transition metal silicate hydrates used in the invention are represented by the following general formula, in which the different components are expressed as the corresponding oxides $$a Me_xO_y \cdot bMO \cdot cAl_2O_3 \cdot SiO_2 \cdot dH_2O) \qquad 1)$$

where
Me represents a transition metal whose molar coefficient a is in a range between 0.001 and 2, preferably between 0.01 and 1;
M represents an alkaline earth metal whose molar coefficient b is in a range between 0 and 2, preferably between 0.3 and 1.6;
The molar coefficient c for $Al_2O_3$ is in a range between 0 and 2, preferably between 0.1 and 1;
$H_2O$ represents the hydration water of the silicate hydrate whose molar coefficient d can vary within a wide range between 0.5 and 20;
x and y can both be equal to 1 or different, depending on the valence of the transition metal, given that the valence of the oxygen atom in the metal oxide is equal to 2.

The transition metal Me is preferably selected from chromium (Cr), manganese (Mn), iron (Fe), cobalt (Co), nickel (Ni), copper (Cu), or zinc (Zn). The silicate hydrate is preferably a mixed silicate hydrate with alkaline earth metals, particularly calcium and magnesium.

Transition metal silicate hydrates of formula 1), referred to in the rest of this document as Me—S—H, are obtained by a process that includes:
1) A first step in which a soluble silicon compound and a soluble transition metal compound, and possibly a soluble alkaline earth metal compound and/or an aluminum compound, react in aqueous phase and alkaline conditions to form a suspension of transition metal silicate hydrate of formula 1);
2) A second step in which the resulting Me—S—H suspension undergoes a mechanical treatment aimed at reducing the particle size of the solid to values below 1000 nm, preferably below 200 nm,
one of the two steps being carried out in the presence of a water-soluble organic dispersant selected from
i. Polyethercarboxylate comb polymers, possibly containing phosphonic or sulfonic groups;
ii. Phosphonic derivatives of polyoxyalkylenes.

The water-soluble organic dispersant can already be present during the first step or it can be added to the aqueous suspension of transition metal silicate hydrate in the second step, before the comminution treatment.

Silicon compounds suitable for the synthesis of Me—S—H in the first step are selected from sodium silicate, potassium silicate, lithium silicate, silicic acid, sodium metasilicate, potassium metasilicate and silica. Sodium metasilicate and sodium silicate are preferably used. If sodium silicate is used, the molar ratio between silicon and sodium $SiO_2/Na_2O$ is between 0.5 and 4, preferably between 0.8 and 2.

Transition metal compounds suitable for the synthesis of Me—S—H in the first step of the process are preferably selected from nitrates, nitrites, acetates, formates, oxides and hydroxides. The molar ratio between transition metals and silicon (Me/Si) for the synthesis of Me—S—H is in a range between 0.001 and 2, preferably between 0.05 and 1.

Alkaline earth compounds possibly suitable for the synthesis of Me—S—H in the first step of the process are preferably selected from nitrates, nitrites, acetates, formates, oxides and hydroxides. The molar ratio between the alkaline earth metal and silicon (M/Si) for the synthesis of Me—S—H is in a range between 0 and 2, preferably between 0.3 and 1.6. Among the alkaline earth metals, calcium and magnesium are preferably used, calcium being the most preferable. Aluminum compounds possibly suitable for the synthesis of Me—S—H in the first step of the process are preferably selected from nitrates, nitrites, acetates, formates, oxides and hydroxides. The molar ratio between aluminum and silicon (Al/Si) for the synthesis of Me—S—H is in a range between 0 and 2, preferably between 0.1 and 1. The reaction between transition metals, and possibly alkaline earth metals and/or aluminum, and silicon is normally carried out in aqueous solution, even though other water-soluble solvent systems can be present, such as alcohols, glycols, glycolethers, in combination with water. The ratio between the total solid content and the reaction solvent in the final suspension of transition metal silicate hydrate obtained in step 1 can vary between 3 and 60%, preferably between 10 and 30%.

The reaction between silicon compounds and metal compounds in the first step of the process is conducted under controlled pH conditions, in a range between pH 9 and 14, preferably between pH 10 and 13, more preferably between pH 10.5 and 12. The precipitation process of the transition metal silicate hydrate can be conveniently conducted at temperatures between 5° C. and 150° C., preferably between 10° C. and 130° C., more preferably between 15° C. and 120° C., and at pressures between 0.8 and 20 bar. The silicon and metal compounds used for the synthesis of the suspension of Me—S—H are separately fed into the reactor as solutions or aqueous suspensions and react for variable times, between 0.1 and 10 hours, preferably between 0.5 and 5 hours. The reactant feed can be simultaneous or one or more reactants can be fed into the reactor at different times.

The category of polyethercarboxylate comb polymers, possibly containing phosphonic or sulfonic groups, includes most of the plasticizers or superplasticizers for cementitious mixes. These polymers can be synthesized according to the following two methodologies.

Method 1. Reaction between a polymer A and a polymer B and possibly an amino compound C. Polymer A is prepared starting from at least one monomer (a) selected from unsaturated mono- and bicarboxylic acids and their derivatives and, possibly, at least one ethylenically unsaturated monomer (b). Polymer B is terminated at one end with a group that is non-reactive towards esterification or amination, in ordinary reaction conditions, and at the other end it bears an amine or hydroxyl functional group. Monomer (a) is selected from the group of unsaturated monocarboxylic acids, unsaturated bicarboxylic acids and their mixtures. Among the unsaturated mono- and bicarboxylic acids, preference is given to acrylic and methacrylic acids, maleic, itaconic and crotonic acids. Mono- and bicarboxylic acids can be used as salts, anhydrides or esters. Monomer (b) is an ethylenically unsaturated compound selected from: ethylenically unsaturated aromatic monomers, like styrene, α-methylstyrene; vinyl compounds like N-vinylpyrrolidone, vinyl acetate, vinyl ether, vinylsulfonic acid, vinylcaprolactam; methallyl monomers, like methallylsulfonic acid, allyl glycidyl ether, allyl polyglycolethers; unsaturated amides or nitriles like acrylonitrile or acrylamide; ethylenically unsaturated compounds like ethylene, propylene, butylene, isobutylene.

The molar ratio between monomer (a) and monomer (b) in polymer A is in the range between 1,000 and 100,000 Dalton, preferably between 1,000 and 50,000 Dalton, more preferably between 2,000 and 15,000 Dalton. Polymer B is terminated at one end with a group that is non-reactive towards esterification and amination in normal conditions. The group preferably has a polyoxyalkylene structure corresponding to the following formula:

$$X\text{-}(EO)_x\text{—}(PO)_y\text{—}(BuO)_z\text{—}R \qquad 2)$$

where x, y, z are each, independently from one another, integers between 0 and 300 and x+y+z=3 or higher;

X=OH or NHR', where R' is an alkyl group having 1-20 carbon atoms, an arylalkyl group having 7-20 carbon atoms or, preferably, X is a hydrogen atom;

R is a non-reactive group towards esterification or amination;

EO=ethyleneoxy, PO=propyleneoxy, BuO=butyleneoxy or isobutyleneoxy. Examples of non-reactive R groups include C1-C4 alkyls.

Ethyleneoxy (EO), propyleneoxy (PO), butyleneoxy (BO) units in polymer B can be present with random or block distributions. Polymer B can also contain, as impurities, bifunctional polyoxyalkylene structures up to 10%, preferably less than 5%, more preferably less than 1%. The molar ratio between terminal hydroxyl and amino groups in polymer B can vary from 100:0 to 0:100, preferably from 100:0 to 5:95, particularly from 100:0 to 20:80, more particularly from 100:0 to 91:9. The molecular weight of polymer B can be included in the range 120-20,000 Dalton, preferably 250-10,000 Dalton.

Amino compound C can be selected from ammonia, ammonium salts, primary alkylamines, C1-C20 linear and branched secondary amines, C1-C20 secondary hydroxyamines. Amino compound C can vary between 0-0.5 units, preferably 0.01-0.3 units of amine per carboxylic acid group in polymer A. The ratio between the sum of carboxyl groups in polymer A and the sum of hydroxyl and amino groups in polymer B can vary from 50:1 to 1.1:1, preferably from 30:1 to 1.1:1.

The reaction of polymers A and B and, possibly, of amino compound C is conducted at partial esterification or amination conditions of carboxyl groups in polymer A. The reaction is preferably conducted at high temperatures, preferably between 140° C. and 250° C., particularly between 150 and 200° C. Catalysts, such as Lewis acids, can also be added to the reaction mixture. The reaction byproducts can be eliminated by steam distillation, by nitrogen flush, under vacuum or by precipitation. At the end of the reaction, the mixture is diluted with water and neutralized to pH=6.5-8.5 with alkaline or alkaline-earth neutralizing agents, ammonium hydroxide or other organic bases. The final concentration of the aqueous solution of superplasticizer can vary from 15 to 70%. Examples of polycarboxylate comb polymers produced according to method 1 are described in WO2011/076655.

Method 2. Copolymer formed by copolymerization of monomer (a) and possibly monomer (b), as previously described, and monomer (c) selected from unsaturated amides or esters of the previously described polymer B. Monomer (c) is preferably an ester or an amide of an α,β-unsaturated carboxylic acid, in particular an ester or an amide of acrylic or methacrylic acid. The molar ratio between monomers (a), (b) and (c) in the aforementioned copolymer varies in the range between (a+c):b=100:0 and (a+c):b=30:70, preferably between 100:0 and 50:50, particularly between 98:2 and 70:30. The molar ratio between monomers (a) and (c) in the copolymer is included in the range between a:c=200:1 and 0.1:1, preferably between 100:1 and 0.1:1, more preferably between 29:1 and 0.1:1.

Copolymerization of monomers (a), (b) and (c) can be carried out using conventional radical polymerization techniques. Suitable initiators are, for example, organic and inorganic peroxides, hydrogen peroxide, persulfates, or azo compounds. The reaction can also be initiated using redox activators. The reaction may also be conducted in the absence or presence of solvent. At the end of the reaction, the mixture is diluted with water and neutralized to pH=6.5-8.5 with alkaline or alkaline-earth neutralizing agents, ammonium hydroxide or other organic bases. The final concentration of the aqueous solution of superplasticizer can vary from 15 to 70%. The average molecular weight (Mw) of the polymer deriving from copolymerization of monomers (a), (b) and (c) is in the range between 5,000 and 300,000 Dalton, preferably between 8,000 and 200,000 Dalton, more preferably between 10,000 and 150,000 Dalton. Examples of polycarboxylate comb polymers produced according to method 2 are described in EP1547986 and U.S. Pat. No. 5,362,324.

Dispersants based on phosphonate derivatives of polyoxylakylenes used for the production of the accelerator of the invention, listed in the category ii), are represented by the following general formula:

$$R\text{—}O(EO)_x\text{—}(PO)_y\text{—}(BuO)_z\text{—}NR'\text{—}CH_2\text{—}PO(OH)_2 \qquad 3)$$

where x, y, z are each, independently from one another, integers between 0 and 300 and x+y+z=3 or higher;

R is an alkyl group with 1-20 carbon atoms or a hydrogen atom;

R' is an alkyl group with 1-20 carbon atoms or a hydrogen atom or the group —CH$_2$—PO(OH)$_2$;

EO=ethyleneoxy, PO=propyleneoxy, BuO=butyleneoxy or isobutyleneoxy.

Ethyleneoxy (EO), propyleneoxy (PO), butyleneoxy (BO) units can be present with random or block distributions.

Examples of such dispersants are reported in Mosquet, M., et al., *Journal of Applied Polymer Sciences*, 65, 1997, 2545-2555. These dispersants can be produced starting from ethoxylated aminoalcohols and by subsequent insertion of a phosphonic group by Irani-Moedritzer reaction.

Other examples of category ii) dispersants based on phosphonate derivatives of polyoxyalkylenes for the production of the accelerator of the invention are represented by the following general formula:

$$O=P(OX)_2-R_1\{-R_2-(R_3)_n-[AO]_q-R_4\}_m \quad 4)$$

where
X=H or an alkaline or alkaline earth metal;
$R_1$ is an organic radical having 1-10 carbon atoms;
$R_2$ can independently be a carboxyl or an amide group;
$R_3$ is an alkyl group with 1-6 carbon atoms;
$R_4$ is a hydrogen atom or an alkyl group with 1-20 carbon atoms;
Group A is independently a C2-C4 alkylene group and the index q has a value included in the range between 2 and 300, in particular between 2 and 50; index m can vary from 1 to 4 and is preferably equal to 3.

The water-soluble organic dispersant based on i) polyethercarboxylate comb polymers, possibly containing phosphonic or sulfonic groups, or ii) phosphonate derivatives of polyoxyalkylenes is added to the suspension in a polymer/Me—S—H weight ratio included between 100:1 and 1:100, preferably between 90:10 and 10:90, more preferably between 80:20 and 20:80.

The aqueous mixture of Me—S—H and organic dispersant based on i) polyethercarboxylate comb polymers, possibly containing phosphonic or sulfonic groups, or ii) phosphonate derivatives of polyoxyalkylenes undergoes a treatment to break apart the solid Me—S—H particles down to a size smaller than 500 nm, preferably smaller than 200 nm. Among the particle disintegration systems that can be conveniently used to prepare the accelerating admixture according to the invention it is possible to mention rotor/stator systems, such as ultra-high shear mixers. Other systems that can conveniently be used are based on high-pressure homogenizers, semi-permeable membranes, or colloidal mills. In particular, the use of sintered metal or ceramic semi-permeable ultrafiltration and nanofiltration membranes surprisingly allows the production of Me—S—H nanoparticles of the optimal size for the purpose of the invention and, at the same time, allows concentration of the product and elimination of soluble salts. The presence of the organic water-soluble dispersant based on i) polyethercarboxylate comb polymers, possibly containing phosphonic or sulfonic groups, or ii) phosphonate derivatives of polyoxyalkylenes has a twofold function: 1) maintaining a low viscosity of the suspension during the particle disintegration process and 2) dispersing and stabilizing the newly-formed Me—S—H nanoparticles. The duration of the disintegration process depends on the adopted methodology and is adjusted according to the desired Me—S—H particle size. Typically, the duration of the process varies from 15 minutes to 24 hours. The disintegration process can conveniently be conducted at temperatures between 5° C. and 90° C., preferably between 10° C. and 80° C., more preferably between 15° C. and 60° C.

At the end of the Me—S—H particle comminution process, the resulting suspension can undergo a curing cycle, inside the disintegration system or in a separate reactor, to make it more homogeneous. The cycle can be conducted at ambient temperature or at higher temperatures, typically below 80° C. Other auxiliary compounds, such as dispersants and/or thickeners and stabilizers, or accelerators, corrosion inhibitors, anti-shrinkage agents, reducing agents, oxidizers, air-entraining agents or defoamers can furthermore be added to the suspension. As previously described, a very interesting and innovative aspect of the transition-metal-silicates lies in the fact that the final product, depending on the synthesis conditions, can be obtained as a liquid suspension or as a water-dispersible gel. This characteristic is determined by the presence of the transition metal in the silicate hydrate and has a specific practical relevance because, in particular circumstances, the use of a solid product can be advantageous compared to the liquid. Moreover, the water-dispersible gel is obtained without any drying or water evaporation, which are very energy-demanding processes. These surprising properties seem to be determined by the fact that the presence of even small quantities of transition metals in the silicate hydrates causes a great increase of the specific surface of the material compared to silicate hydrates that do not contain transition metals, such as calcium-based ones. The effect is easily verifiable through specific-surface analysis with the Brunauer-Emmet-Teller (BET) method, which allows the measurement of the specific surface area of a solid by measuring the amount of nitrogen adsorbed on it. The formation of the water-dispersible gel occurs spontaneously at the end of the production process when a sufficient quantity of transition metal is present with respect to the other components of the silicate hydrate. The quantity of transition metal necessary to achieve formation of the water-dispersible gel depends on the type of metal and the amount of solids in the suspension. In general, it is possible to obtain water-dispersible gels with a total solid content of about 20% when the molar coefficient a of formula 1) of the transition metal silicate hydrate of the invention reaches a value of at least 0.1.

The nanoparticles of Me—S—H, thanks to their extremely small size, are able to induce nucleation of the hydration products of cement not only on the surface of cement grains but also inside the capillary pores of the cementitious structure. Consequently, the hydrated structure of the cementitious conglomerate turns out to be more homogeneous and compact and, therefore, less sensitive to penetration of water and to the aggressive agents therein dissolved, such as sulfates and chlorides. It is well known that sulfates and chlorides cause degradation of cementitious structures through corrosion of rebar and expansive phenomena due to the formation of ettringite. Therefore, the use of the admixture of the invention also improves the durability of cementitious conglomerates. Furthermore, the use of the admixture in the hydraulic-binder-based solidification/stabilization processes of waste can improve the hydration reaction of cement at long curing times, which is frequently inhibited by the presence of organic and inorganic contaminants. The improving effect reduces the capillary porosity of the cement paste and therefore water diffusion within the porosity with the resulting reduced tendency to leaching of contaminants to the environment. The accelerating admixture is added in variable amounts, from 0.01 to 40% with respect to the weight of the binder, preferably from 0.05 to 30%, more preferably from 0.1 to 20% with respect to the weight of the binder. The binding system is typically composed of portland cement, mixtures of portland cement and alumina cement, slaked lime, hydraulic lime, mixtures of the aforementioned binders with finely ground slag and/or fly ash.

The characteristics of the invention are described in further detail in the following examples.

EXAMPLE 1

Figure 1:
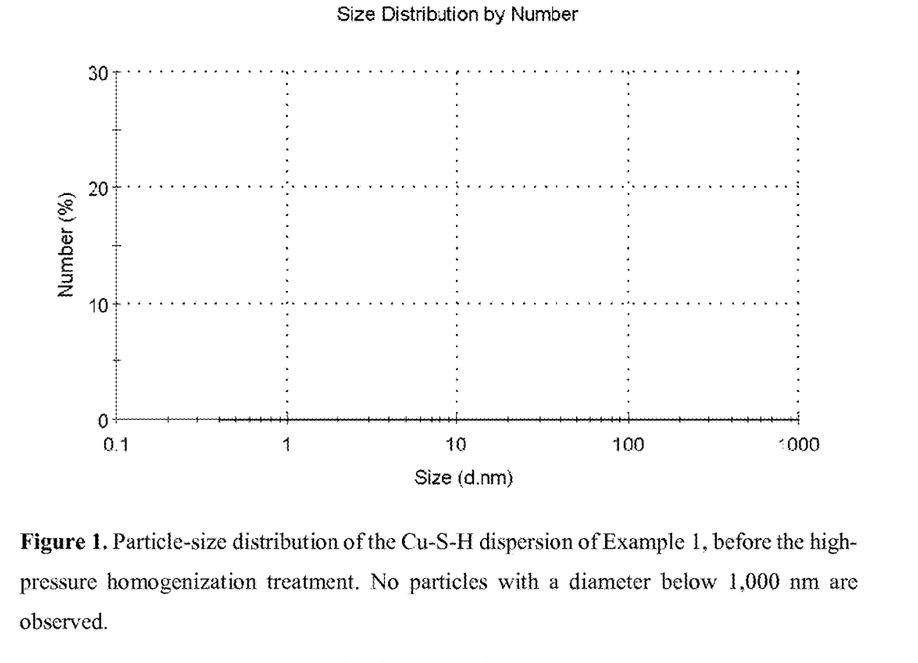
FIG. 1 shows the particle-size distribution of the Cu—S—H dispersion before the high-pressure homogenization treatment.

This example illustrates the first step of the synthetic process for the preparation of 2 Kg of a copper silicate hydrate suspension. 141.88 g of a 55% solution of copper nitrate (Solution A) and 244 g of a solution prepared dissolving 68.48 g of sodium metasilicate pentahydrate in 175.52 g $H_2O$ (Solution B) are added with stirring (400 rpm) to a 3-L reactor containing 1610 g $H_2O$. Solutions A and B are added with peristaltic pumps at rates of 4.73 g/min and 8.13 g/min respectively so that the additions are completed in 30 minutes. A few minutes after the beginning of the reactant addition, the solution in the reactor starts to get cloudy due to the formation of a fine precipitate of copper silicate hydrate in a strong blue coloration. At the end of the addition of both reactants, the resulting suspension is left under stirring for an additional 60 minutes. An aliquot of the suspension, which has a total solid content of 5%, is filtered and washed repeatedly with distilled water. After drying to constant weight at 105° C., the precipitate is dissolved by acid attack and analyzed via ICP-AES (Inductively Coupled Plasma). The copper content in the dry silicate hydrate is 19.5%. The particle-size-distribution analysis of the suspension is carried out through dynamic light scattering (DLS) using a ZetaSizer Nano ZS instrument (Malvern Instruments Ltd) and does not show any particles with a diameter below 1,000 nm (FIG. 1).

EXAMPLE 2

Figure 2:
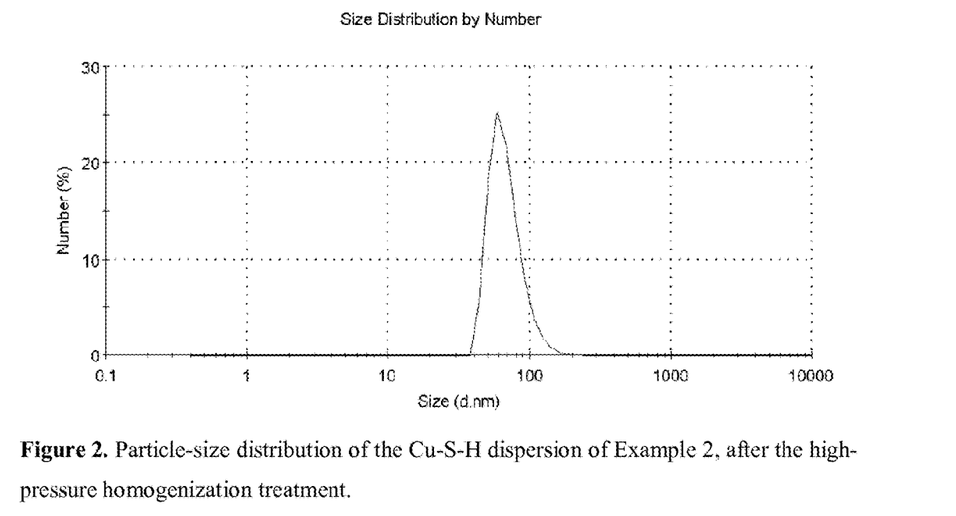
FIG. 2 shows the particle-size distribution of the Cu—S—H dispersion after the high-pressure homogenization treatment.

70 g of a 29% aqueous solution of a polyethercarboxylate polymer composed of a methacrylic acid and methoxypolyethylene glycol methacrylate copolymer, obtained by radical polymerization in aqueous solution according to Method 2, are added under stirring to the product obtained in Example 1 (first step of the synthetic process). The molecular weight of the methoxypolyethylene glycol methacrylate is about Mw=5,000 Dalton, while the molecular weight of the copolymer, determined by Gel Filtration Chromatography (GFC), is Mw=75,000 Dalton. The mixture is subsequently subjected to a treatment aimed at reducing the particle size by high-pressure homogenization, using a GEA-Niro Soavi Panda instrument (4 complete cycles at 400 bar of pressure). The final product has a solid content of 6%. Characterization by DLS using a ZetaSizer Nano ZS instrument (Malvern Instruments Ltd), in the range 0-1,000 nm, shows a number unimodal distribution centered on 68 nm (FIG. 2).

EXAMPLE 3

Figure 3:
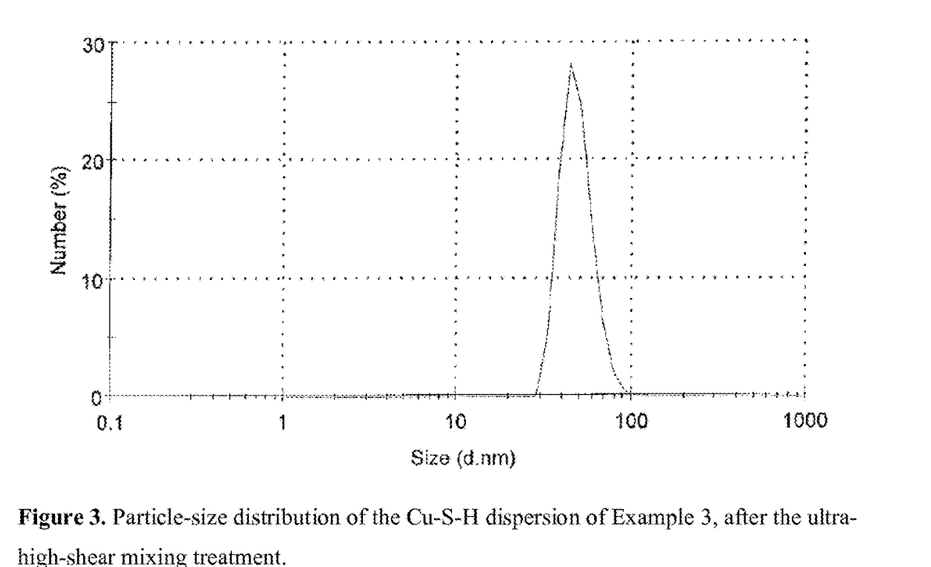
FIG. 3 shows the particle-size distribution of the Cu—S—H dispersion after the ultra-high-shear mixing treatment.

This example illustrates the production of a suspension of copper silicate hydrate by ultra-high-shear mixing with a rotor/stator system. 35 g of a 29% aqueous solution of polyethercarboxylate polymer composed of a methacrylic acid and methoxypolyethylene glycol methacrylate copolymer, obtained by radical polymerization in aqueous solution according to Method 2 are added with stirring to 1,000 g of the product obtained in Example 1. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The mixture is then kept under stirring at 50° C. at about 300 rpm and is circulated through the cell of an on-line rotor/stator ultra-high shear mixer (Silverson L4RT) for 7 hours at 8,000 rpm. The particle-size distribution shown in FIG. 3 is obtained by DLS (Nano ZS instrument, Malvern Instruments Ltd). The solid content of the final product is 6%.

EXAMPLE 4

Figure 4:
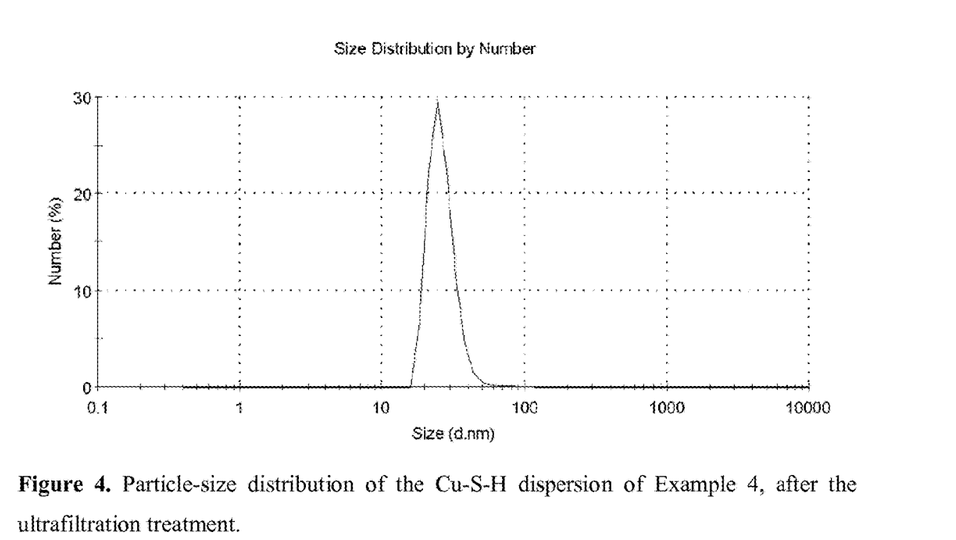
FIG. 4 shows the particle-size distribution of the Cu—S—H dispersion after the ultrafiltration treatment.

This example illustrates the production of a suspension of copper silicate hydrate by particle size reduction with an ultrafiltration system. 3.64 Kg of a 29% aqueous solution of polyethercarboxylate polymer composed of a methacrylic acid and methoxypolyethylene glycol methacrylate copolymer, obtained by radical polymerization in aqueous solution according to Method 2 are added to 52 Kg of product obtained according to the methodology described in Example 1. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The mixture is then kept under stirring at 50° C. at about 300 rpm and is circulated, by means of a pump, through a system of ceramic tubular ultrafiltration membranes with molecular weight cut-off of 100,000 Dalton. The membrane permeate, a dilute sodium nitrate solution, is removed while the retentate is the concentrated copper silicate hydrate suspension that is circulated in the reactor. The final concentrated product in the reactor has a solid content of 10.5%. The particle-size distribution is shown in FIG. 4 and is obtained by DLS (Nano ZS instrument, Malvern Instruments Ltd). As it is possible to note from FIG. 4, the ultrafiltration treatment causes a reduction of the particle size distribution of the copper silicate hydrate to the nanometer range.

EXAMPLE 5

Figure 5:
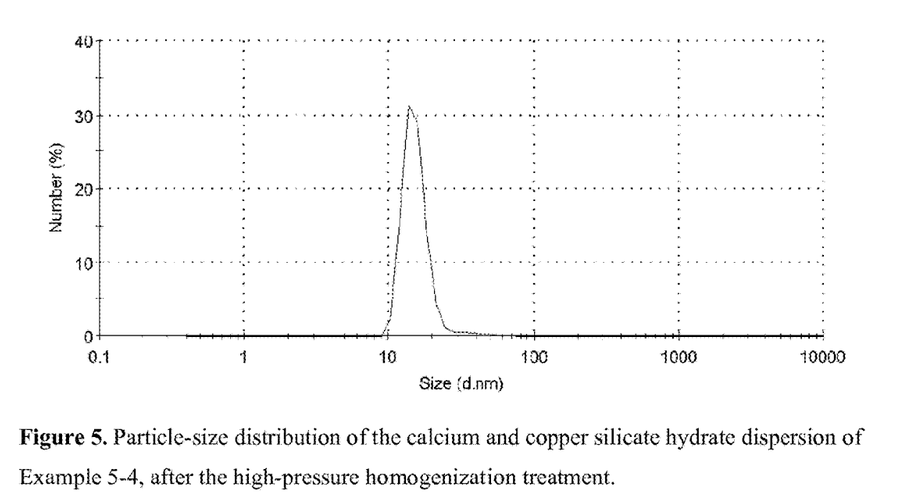
FIG. 5 shows the particle-size distribution of the calcium and copper silicate hydrate dispersion after the high-pressure homogenization treatment.

This example describes the production of aqueous suspensions of mixed calcium and transition metal silicate hydrates. The procedure is similar to that described in Examples 1 and 2, with the sole difference that Solution A is prepared by dissolving a predetermined amount of transition metal nitrate (in this particular case Cu, Mn, Cr) in a 50% solution of calcium nitrate. The exact amounts of all the components necessary to the preparation of the admixtures are reported in Table 1. All of the products thus obtained are subsequently formulated with a proper amount of a 29% aqueous solution of polyethercarboxylate polymer composed of a methacrylic acid and methoxypolyethylene glycol methacrylate copolymer, obtained by radical polymerization in aqueous solution according to Method 2. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The resulting suspensions of mixed transition metal silicate hydrates are each subjected to 4 complete homogenization cycles at 400 bar (Panda instrument, GEA-Niro Soavi). The dispersions thus obtained are made of nanoparticles of mixed calcium and transition metal silicate hydrate. FIG. 5 shows, as an example, the particle-size distribution of a mixed calcium and copper silicate (Example 5-4, Table 1) measured with a Nano ZS instrument (Malvern Instruments Ltd). Before formulation with the dispersant polymer, an aliquot of each sample is filtered under vacuum and repeatedly washed with distilled water to determine the transition metal content in the solid. The filtered and washed samples are then treated with acid and analyzed by ICP-AES. The analytical results in Table 1 confirm the quantitative precipitation of the transition metal as a mixed silicate hydrate.

TABLE 1

Composition of the dispersions of mixed calcium and transition metal silicate hydrates containing polyethercarboxylate polymers

| Accelerator | Transition metal Salt | Transition metal Amount (g) | Ca(NO₃)₂ 50% solution (g) | Na₂SiO₃·5H₂O, 27.6% solution (g) | H₂O (g) | Carboxylate polymer, 29% solution (g) | Final dry content (%) | Metal in Me—S—H (%) |
|---|---|---|---|---|---|---|---|---|
| Example 5-1 | Cr(NO₃)₃·9H₂O | 1.48 | 120.4 | 254.2 | 636 | 70 | 11.8 | 0.35 |
| Example 5-2 | Cr(NO₃)₃·9H₂O | 7.42 | 115.6 | 254.2 | 636 | 70 | 11.6 | 1.75 |
| Example 5-3 | Cr(NO₃)₃·9H₂O | 14.8 | 109.5 | 254.2 | 636 | 70 | 11.7 | 3.60 |
| Example 5-4 | Cu(NO₃)₂·3H₂O | 0.90 | 120.4 | 254.2 | 636 | 70 | 11.9 | 0.40 |
| Example 5-5 | Cu(NO₃)₂·3H₂O | 4.48 | 115.6 | 254.2 | 636 | 70 | 11.7 | 2.00 |
| Example 5-6 | Cu(NO₃)₂·3H₂O | 8.96 | 109.5 | 254.2 | 636 | 70 | 11.5 | 4.05 |
| Example 5-7 | Mn(NO₃)₂·4H₂O | 0.93 | 120.4 | 254.2 | 636 | 70 | 11.8 | 0.34 |
| Example 5-8 | Mn(NO₃)₂·4H₂O | 4.65 | 115.6 | 254.2 | 636 | 70 | 11.9 | 0.68 |
| Example 5-9 | Mn(NO₃)₂·4H₂O | 9.31 | 109.5 | 254.2 | 636 | 70 | 12.0 | 3.42 |
| Example 5-10 | Cu(NO₃)₂·3H₂O | 1.77 | 238.0 | 502.7 | 258 | 140 | 22.7 | 0.40 |

EXAMPLE 6

This example describes the preparation of aqueous suspensions of mixed calcium and transition metal silicate hydrates, formulated with an organic dispersant belonging to the family of phosphonic derivatives of polyoxyalkylenes (formula 3). The polymer is obtained by reaction of 1 mole of 2-(2-aminoethylaminoethanol) with 50 moles of ethylene oxide and subsequent derivatization of the free amino group with 2 moles of formaldehyde and phosphorous acid, according to the Irani-Moedritzer reaction. The procedure for the preparation of the accelerating admixture is similar to that followed in Example 5. The exact amounts of all the necessary components for the preparation of the admixtures are reported in Table 2. All the inorganic dispersions are formulated with the proper amount of a 28% aqueous solution of a phosphonic derivative of polyoxyethylene (formula 3). The resulting suspensions of mixed transition metal silicate hydrates are each subjected to four complete homogenization cycles at 400 bar (Panda instrument, GEA-Niro Soavi). The dispersions thus obtained are composed of nanoparticles of mixed calcium and transition metal silicate hydrates.

EXAMPLE 7

This example illustrates the synthetic process for the preparation of about 2 Kg of dispersion of mixed manganese and calcium silicate hydrate as a water-dispersible gel. Two solutions, denominated Solution A and Solution B, are added with stirring (400 rpm) to a 3-L reactor containing 501.76 g H20. Solution A is prepared by mixing 429.22 g of a 50% solution of calcium nitrate with 52.5 g of a 50% solution of manganese nitrate. Solution B is obtained by dissolving 277.42 g of sodium metasilicate pentahydrate in 727.2 g H₂O. The two solutions are added with peristaltic pumps at rates of 16.45 g/min and 33.49 g/min respectively so that the additions are completed in 30 minutes. The content of the reactor is kept under constant stirring at 400 rpm. A few minutes after the beginning of the reactant addition, the solution in the reactor starts to get cloudy due to the formation of a fine precipitate of calcium and manganese silicate hydrate in a strong brown coloration. At the end of the addition of both reactants, the resulting suspension is left under stirring for an additional 60 minutes. 280 g of a 29% aqueous solution of polyethercarboxylate polymer composed of a methacrylic acid and methoxypolyethylene glycol methacrylate copolymer, obtained by radical polymerization in aqueous solution according to Method 2, are added with stirring to the suspension in the reactor. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The mixture is subsequently subjected to a treatment aimed at reducing the particle size

TABLE 2

Compositions of the dispersions of mixed calcium and transition metal silicate hydrates containing phosphonate polymers.

| Accelerator | Transition metal Salt | Transition metal Amount (g) | Ca(NO₃)₂ 50% solution (g) | Na₂SiO₃·5H₂O, 27.6% solution (g) | H₂O (g) | Phosphonate polymer, 28% solution (g) | Final dry content (%) | Metal in Me—S—H (%) |
|---|---|---|---|---|---|---|---|---|
| Example 6-1 | Cr(NO₃)₃·9H₂O | 1.48 | 120.4 | 254.2 | 636 | 72.5 | 11.6 | 0.37 |
| Example 6-2 | Cr(NO₃)₃·9H₂O | 7.42 | 115.6 | 254.2 | 636 | 72.5 | 11.9 | 1.80 |
| Example 6-3 | Cr(NO₃)₃·9H₂O | 14.8 | 109.5 | 254.2 | 636 | 72.5 | 11.5 | 3.65 |
| Example 6-4 | Cu(NO₃)₂·3H₂O | 0.90 | 120.4 | 254.2 | 636 | 72.5 | 11.7 | 0.42 |
| Example 6-5 | Cu(NO₃)₂·3H₂O | 4.48 | 115.6 | 254.2 | 636 | 72.5 | 11.2 | 2.10 |
| Example 6-6 | Cu(NO₃)₂·3H₂O | 8.96 | 109.5 | 254.2 | 636 | 72.5 | 11.8 | 4.08 |
| Example 6-7 | Mn(NO₃)₂·4H₂O | 0.93 | 120.4 | 254.2 | 636 | 72.5 | 11.4 | 0.36 |
| Example 6-8 | Mn(NO₃)₂·4H₂O | 4.65 | 115.6 | 254.2 | 636 | 72.5 | 11.6 | 0.70 |
| Example 6-9 | Mn(NO₃)₂·4H₂O | 9.31 | 109.5 | 254.2 | 636 | 72.5 | 12.3 | 3.45 |
| Example 6-10 | Cu(NO₃)₂·3H₂O | 1.77 | 238.0 | 502.7 | 258 | 145 | 22.9 | 0.43 | by high-pressure homogenization, using a GEA-Niro Soavi Panda instrument (8 complete cycles at 400 bar of pressure). The final product has a total solid content of 23%. At the end of the treatment, the product is poured in a plastic container in which, within 24 hours, it spontaneously turns into a water-dispersible gel. The equivalent product that does not contain transition metals is described in the following comparative Examples 9 and 10. In the latter case, at the end of the high-pressure homogenization, the resulting product remains as an indefinitely stable liquid suspension.

EXAMPLE 8

Comparative

This comparative example illustrates the synthesis of a suspension of calcium silicate hydrate that does not contain transition metals. 1,272 g $H_2O$ are fed under stirring into a 3-L laboratory reactor and are then adjusted to pH=11±0.1 by addition of a 30% NaOH solution. 240 g of a 50% calcium nitrate solution adjusted to pH=11±0.1 by addition of 3.2 g of a 30% NaOH solution (Solution A) and 508 g of a 27.6% water solution of sodium metasilicate pentahydrate (Solution B) are then added into the reactor under stirring (400 rpm). The two solutions are added with peristaltic pumps so that the additions are completed in 30 minutes. A few minutes after the beginning of the reactant addition, the solution in the reactor starts to get cloudy due to the formation of a white precipitate of calcium silicate hydrate, until a somewhat dense white mixture is obtained. At the end of the addition of both reactants, the resulting suspension is left under stirring for an additional 60 minutes. About 2000 g of a milky-white suspension of calcium silicate hydrate crystals are thus obtained. The total solid content of the product is 8.9%. The particle-size-distribution analysis of the suspension is carried out through dynamic light scattering (DLS) using a ZetaSizer Nano ZS instrument (Malvern Instruments Ltd) and does not show any particles with a diameter below 1,000 nm.

EXAMPLE 9

Comparative

This comparative example illustrates the synthesis of a suspension of calcium silicate hydrate that does not contain transition metals. 260 g $H_2O$ are fed under stirring into a 2-L laboratory reactor and are then adjusted to pH=11±0.1 by addition of a 30% NaOH solution. 240 g of a 50% calcium nitrate solution adjusted to pH=11±0.1 by addition of 3.2 g of a 30% NaOH solution (Solution A) and 503 g of a 27.6% water solution of sodium metasilicate pentahydrate (Solution B) are then added into the reactor under stirring (400 rpm). The two solutions are added with peristaltic pumps so that the additions are completed in 30 minutes. A few minutes after the beginning of the reactant addition, the solution in the reactor starts to get cloudy due to the formation of a white precipitate of calcium silicate hydrate, until a somewhat thick white mixture is obtained. At the end of the addition of both reactants, the resulting suspension is left under stirring for an additional 60 minutes. About 2000 g of a dense milky-white suspension of calcium silicate hydrate crystals are thus obtained. The total solid content of the product is 18.7%. The particle-size-distribution analysis of the suspension is carried out through dynamic light scattering (DLS) using a ZetaSizer Nano ZS instrument (Malvern Instruments Ltd) and does not show any particles with a diameter below 1,000 nm.

EXAMPLE 10

Comparative 140 g of a 29% aqueous solution of polyethercarboxylate polymer composed of a methacrylic acid and methoxypolyethylene glycol methacrylate copolymer, obtained by radical polymerization in aqueous solution according to Method 2, are added with stirring to the product obtained in Comparative Example 9. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The mixture is subsequently subjected to a treatment aimed at reducing the particle size by high-pressure homogenization, using a GEA-Niro Soavi Panda instrument (4 complete cycles at 400 bar of pressure). The final product has a total solid content of 23.5%.

EXAMPLE 11

This example reports the mortar evaluation of the accelerating admixture prepared in Example 2. The admixture is prepared by subjecting a suspension of copper silicate hydrate to a particle-size-reduction process with a high-pressure homogenizer in the presence of a polyethercarboxylate polymer composed of a methacrylic acid and methoxypolyethylene glycol methacrylate copolymer, obtained by radical polymerization in aqueous solution according to Method 2. The molecular weight of the methoxypolyethylene glycol methacrylate is about Mw=5,000 Dalton, while the molecular weight of the copolymer, determined by Gel Filtration Chromatography (GFC), is Mw=75,000 Dalton. Mortar specimens were prepared according to European norm EN 196/1, using a CEM I portland cement in agreement with European norm UNI-EN 197-1:2006. The mixes were prepared with a water/cement ratio W/C=0.42 and a sand/cement ratio S/C=3 and with a dosage of Dynamon NRG1010 (Mapei S.p.A.) superplasticizer of 0.60 weight % with respect to cement weight. Mortar specimens were compacted into 40×40×160-mm polystyrene molds and cured at 20° C., 95% r.h. Compressive strengths after 6, 7 and 8 hours of curing of the specimens containing 8 weight % (0.48% of dry content) of the accelerating admixture of Example 2 and of reference samples without the admixture are reported in Table 3.

TABLE 3

Mortar evaluation of the accelerator described in Example 2.

| ADMIXTURE | Dry content % | Dosage (g. admixture/ 100 g. cement) | Flow (mm) | Compressive strength (N/mm$^2$) | | |
|---|---|---|---|---|---|---|
| | | | | 6 h | 7 h | 8 h |
| None | — | — | 231 | 2.1 | 4.5 | 8.4 |
| Example 2 | 6.0 | 8.0 | 250 | 2.5 | 7.1 | 13.8 |

The mortar results show a noteworthy accelerating effect of the admixture of Example 2 in the development of compressive strengths at short curing times.

EXAMPLE 12

This example reports the mortar evaluation of the accelerating admixture prepared in Example 3. The admixture is prepared by subjecting a suspension of copper silicate hydrate to a particle-size-reduction process with a rotor/stator system in the presence of a polyethercarboxylate polymer composed of a methacrylic acid and methoxypolyethylene glycol methacrylate copolymer, obtained by radical polymerization in aqueous solution according to Method 2. The molecular weight of the methoxypolyethylene glycol methacrylate is about Mw=5,000 Dalton, while the molecular weight of the copolymer, determined by Gel Filtration Chromatography (GFC), is Mw=75,000 Dalton. Mortar specimens were prepared according to European norm EN 196/1, using a CEM I portland cement in agreement with European norm UNI-EN 197-1:2006. The mixes were prepared with a water/cement ratio W/C=0.42 and a sand/cement ratio S/C=3 and with a dosage of Dynamon NRG1010 (Mapei S.p.A.) superplasticizer of 0.60 weight % with respect to cement weight. Mortar specimens were compacted into 40×40×160-mm polystyrene molds and cured at 20° C., 95% r.h. Compressive strengths after 6, 7 and 8 hours of curing of the specimens containing 8 weight % (0.48% of dry content) of the accelerating admixture of Example 3 and of reference samples without the admixture are reported in Table 4.

TABLE 4

Mortar evaluation of the accelerator described in Example 3.

| ADMIXTURE | Dry content % | Dosage (g. admixture/ 100 g. cement) | Flow (mm) | Compressive strength (N/mm$^2$) | | |
|---|---|---|---|---|---|---|
| | | | | 6 h | 7 h | 8 h |
| None | — | — | 231 | 2.1 | 4.5 | 8.4 |
| Example 3 | 6.0 | 8.0 | 250 | 2.3 | 6.9 | 13.4 |

EXAMPLE 13

This example reports the mortar evaluation of the accelerating admixture prepared in Example 4. The admixture is prepared by subjecting a suspension of copper silicate hydrate to a particle-size-reduction process through ultrafiltration in the presence of a polyethercarboxylate polymer composed of a methacrylic acid and methoxypolyethylene glycol methacrylate copolymer, obtained by radical polymerization in aqueous solution according to Method 2. The molecular weight of the methoxypolyethylene glycol methacrylate is about Mw=5,000 Dalton, while the molecular weight of the copolymer, determined by Gel Filtration Chromatography (GFC), is Mw=75,000 Dalton. Mortar specimens were prepared according to European norm EN 196/1, using a CEM I portland cement in agreement with European norm UNI-EN 197-1:2006. The mixes were prepared with a water/cement ratio W/C=0.42 and a sand/cement ratio S/C=3 and with a dosage of Dynamon NRG1010 (Mapei S.p.A.) superplasticizer of 0.60 weight % with respect to cement weight. Mortar specimens were compacted into 40×40×160-mm polystyrene molds and cured at 20° C., 95% r.h. Compressive strengths after 6, 7 and 8 hours of curing of the specimens containing 8 weight % (0.48% of dry content) of the accelerating admixture of Example 3 and of reference samples without the admixture are reported in Table 5.

TABLE 5

Mortar evaluation of the accelerator described in Example 4.

| ADMIXTURE | Dry content % | Dosage (g. admixture/ 100 g. cement) | Flow (mm) | Compressive strength (N/mm$^2$) | | |
|---|---|---|---|---|---|---|
| | | | | 6 h | 7 h | 8 h |
| None | — | — | 231 | 2.1 | 4.5 | 8.4 |
| Example 4 | 6.0 | 8.0 | 245 | 2.9 | 8.0 | 15.3 |

EXAMPLE 14

Figure 6:
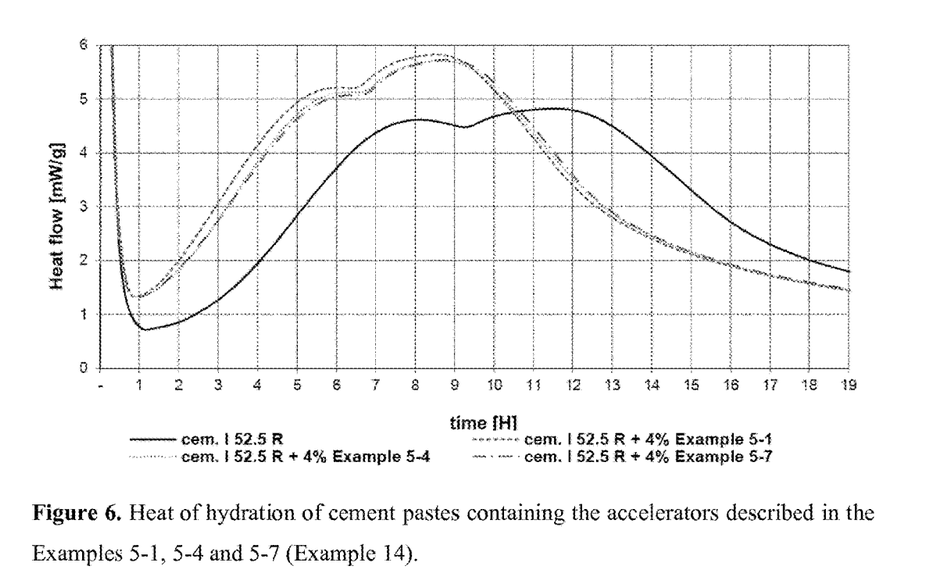
FIG. 6 shows the heat of hydration of cement pastes containing the accelerators described in Examples 5-1, 5-4 and 5-7 (Example 14).
Figure 7:
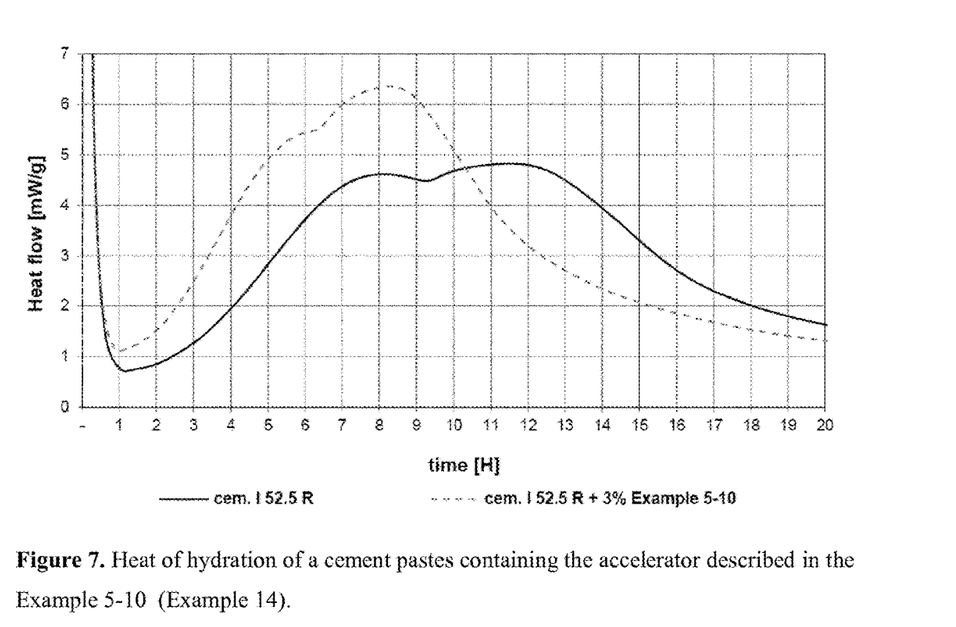
FIG. 7 shows the heat of hydration of a cement pastes containing the accelerator described in Example 5-10 (Example 14).

This example reports the calorimetric and mortar evaluations of the accelerating admixtures described in Example 5. The admixtures are prepared by subjecting the suspensions of mixed calcium and transition metal silicate hydrates to a particle-size-reduction process with a high-pressure homogenizer in the presence of a polyethercarboxylate polymer composed of a methacrylic acid and methoxypolyethylene glycol methacrylate copolymer, obtained by radical polymerization in aqueous solution according to Method 2. The molecular weight of the methoxypolyethylene glycol methacrylate is about Mw=5,000 Dalton, while the molecular weight of the copolymer, determined by Gel Filtration Chromatography (GFC), is Mw=75,000 Dalton. The calorimetric measurements were carried out with a TAM Air calorimeter, using CEM I portland cement pastes, with a water/cement ratio W/C=0.44. The admixtures (Example 5) were dosed at 4 weight % with respect to cement (0.48% of dry content), with the exception of Example 5-10, which was dosed at 3% (0.68% of dry content). All the mixes were compared to an equivalent paste without the admixture. The heat evolution curves for the first 20 hours of hydration of the cement pastes are reported in FIG. 6 (Examples 5-1, 5-4, 5-7) and FIG. 7 (Example 5-10). The curves show the accelerating effect as highlighted by the early hydration heat development compared to the admixture-free paste (solid line). Mortar specimens were prepared according to European norm EN 196/1, using a CEM I portland cement in agreement with European norm UNI-EN 197-1:2006. The mixes were prepared with a water/cement ratio W/C=0.42 and a sand/cement ratio S/C =3 and with a dosage of Dynamon NRG1010 (Mapei S.p.A.) superplasticizer of 0.70 weight % with respect to cement weight. Mortar specimens were compacted into 40×40×160-mm polystyrene molds and cured at 20° C., 95% r.h. Compressive strengths after 6, 7 and 8 hours of curing of the specimens are reported in Table 6.

TABLE 6

Mortar evaluation of the admixtures described in Example 5.

| ADMIXTURE | Transition metal | Dry content % | Dosage (g. admixture/ 100 g. cement) | Flow (mm) | Compressive strengths (N/mm$^2$) | | |
|---|---|---|---|---|---|---|---|
| | | | | | 6 h | 7 h | 8 h |
| None | — | — | — | 230 | 2.0 | 4.1 | 7.9 |
| Example 5-1 | Cr | 11.8 | 4.0 | 255 | 5.1 | 14.1 | 18.5 |
| Example 5-2 | Cr | 11.6 | 4.0 | 250 | 5.2 | 14.8 | 20.6 |
| Example 5-3 | Cr | 11.7 | 4.0 | 255 | 6.3 | 15.2 | 20.8 |
| Example 5-4 | Cu | 11.9 | 4.0 | 260 | 4.9 | 11.7 | 16.6 |
| Example 5-5 | Cu | 11.7 | 4.0 | 260 | 5.9 | 14.7 | 20.7 |
| Example 5-6 | Cu | 11.5 | 4.0 | 260 | 6.6 | 15.3 | 22.7 |
| Example 5-7 | Mn | 11.8 | 4.0 | 260 | 6.2 | 14.7 | 19.9 |
| Example 5-8 | Mn | 11.9 | 4.0 | 255 | 6.5 | 16.2 | 22.3 |
| Example 5-9 | Mn | 12.0 | 4.0 | 255 | 6.7 | 19.8 | 22.8 |

The results in Table 6 confirm a noteworthy effect of the transition metal silicate hydrates in accelerating the development of compressive strength. In particular, for all of the metals employed (Mn, Cr, Cu) it is possible to observe an increase of the compressive strength development as the transition metal content in the silicate increases.

EXAMPLE 15

This example reports the concrete evaluations of the accelerating admixtures described in Example 5-10 and Example 6-10. As a comparison, the evaluation includes comparative Example 10, based on pure calcium silicate hydrate, and a traditional calcium-nitrate-based accelerator (Mapefast CFL, Mapei S.p.A.). Concrete mixes were prepared using a CEM I portland cement, according to European norm UNI-EN 197-1:2006, and alluvial aggregate with a maximum diameter of 20 mm. The water/cement ratio W/C=0.43 and the S4 slump consistency class (160-210 mm) were obtained with a dosage of Dynamon NRG1010 (Mapei S.p.A.) superplasticizer of 0.65 weight % with respect to cement weight. Table 7 reports the compressive strength values of the specimens cured at 20° C. and 95% r.h., while Table 8 reports the compressive strength of the specimens cured at 5° C.

TABLE 7

Concrete evaluations of the accelerators described in Examples 5-10 and 6-10 (curing at 20° C.)

| ADMIXTURE | Dry content (%) | Dosage (kg. admixture/ 100 kg. cement) | Compressive strength (N/mm$^2$) | | | | |
|---|---|---|---|---|---|---|---|
| | | | 6 h | 8 h | 9 h | 24 h | 28 gg |
| Example 5-10 | 22.7 | 2.0 | 5.7 | 15.5 | 23.5 | 45.1 | 71.5 |
| Example 6-10 | 22.4 | 2.0 | 5.5 | 15.0 | 23.0 | 44.5 | 70.9 |
| Example 10-comparative | 23.5 | 2.0 | 5.0 | 14.5 | 20.5 | 41.5 | 70.8 |
| Mapefast CLF | 34.0 | 2.5 | 3.3 | 14.1 | 19.4 | 42.6 | 68.4 |

TABLE 8

Concrete evaluations of the accelerators described in Examples 5-10 and 6-10 (curing at 5° C.)

| ADMIXTURES | Dry content (%) | Dosage (kg. admixture/ 100 kg. cement) | Compressive strength (N/mm$^2$) 24 h |
|---|---|---|---|
| Example 5-10 | 22.7 | 2.0 | 22.0 |
| Example 6-10 | 22.4 | 2.0 | 21.0 |
| Example 10 - comparative | 24.0 | 2.0 | 19.7 |
| Mapefast CLF | 34.0 | 2.5 | 18.7 |

As can be observed from the results in Tables 7 and 8, the accelerating admixtures of the invention (Examples 5-10 and 6-10) show a superior accelerating effect compared to pure calcium silicate hydrate and calcium nitrate, which represent the current state of the art.

EXAMPLE 16

This example reports the concrete evaluation of the accelerating admixture described in Example 7. The admixture is a water-dispersible gel based on manganese silicate hydrate and the concrete specimens prepared with it are compared to admixture-free ones. Concrete mixes were prepared using a CEM I portland cement, according to European norm UNI-EN 197-1:2006, and alluvial aggregate with a maximum diameter of 20 mm. The water/cement ratio W/C=0.40 and the S4 slump consistency class (160-210 mm) were obtained with a dosage of Dynamon NRG1010 (Mapei S.p.A.) superplasticizer of 0.70 weight % with respect to cement weight. Table 9 reports the compressive strength values of the specimens cured at 20° C. and 95% r.h., while Table 10 reports the compressive strength of the specimens cured at 5° C.

TABLE 9

Concrete evaluation of the accelerator described in Example 7 (curing at 20° C.)

| ADMIXTURE | Dry content (%) | Dosage (kg. admixture/ 100 kg. cement) | Compressive strength (N/mm$^2$) | | | |
|---|---|---|---|---|---|---|
| | | | 6 h | 8 h | 9 h | 24 h |
| Example 7 | 23.0 | 2.0 | 4.7 | 11.9 | 20.5 | 40.8 |
| — | — | — | 1.2 | 4.3 | 6.8 | 38.7 |

TABLE 10

Concrete evaluation of the accelerator
described in Example 7 (curing at 5° C.)

| ADMIXTURE | Dry content (%) | Dosage (kg. admixture/ 100 kg. cement) | Compressive strength (N/mm$^2$) 24 h |
|---|---|---|---|
| Example 7 | 23.0 | 2.0 | 19.7 |
| — | — | — | 8.8 |

As can be observed from the results in Tables 9 and 10, the accelerating admixture of Example 7, a water-dispersible gel based on manganese silicate hydrate, shows a superior accelerating effect compared to admixture-free concrete samples.

EXAMPLE 17

An aliquot of the transition-metal-silicate-hydrate-based admixtures of Examples 5-1, 5-3, 5-4, 5-6, 5-7 and 5-9 were filtered at the end of the first step of the synthetic process (before adding the carboxylate polymer). The filter cake was repeatedly washed with 2-ethoxyethanol and oven-dried at 105° C. for 24 hours. The product of comparative Example 8, based on pure calcium silicate hydrate, was subjected to the same treatment. The samples were analyzed by BET to determine the specific surface areas. The results of the BET analyses are reported in Table 11.

TABLE 11

BET analysis results for the samples of
the invention and comparative Example 8.

| ADMIXTURE | BET (m$^2$/g) |
|---|---|
| Example 5-1 | 333 |
| Example 5-3 | 359 |
| Example 5-4 | 466 |
| Example 5-6 | 484 |
| Example 5-7 | 442 |
| Example 5-9 | 487 |
| Comparative Example 8 | 250 |

As it possible to notice from the results in Table 11, the samples based on transition metal silicate hydrates have a higher surface area compared to the pure calcium-silicate-hydrate-based sample. The increase, which occurs for even small quantities of transition metal in the silicate, presumably contributes to boosting compressive strength development in addition to causing the formation of water-dispersible gels.

EXAMPLE 18

Figure 8:
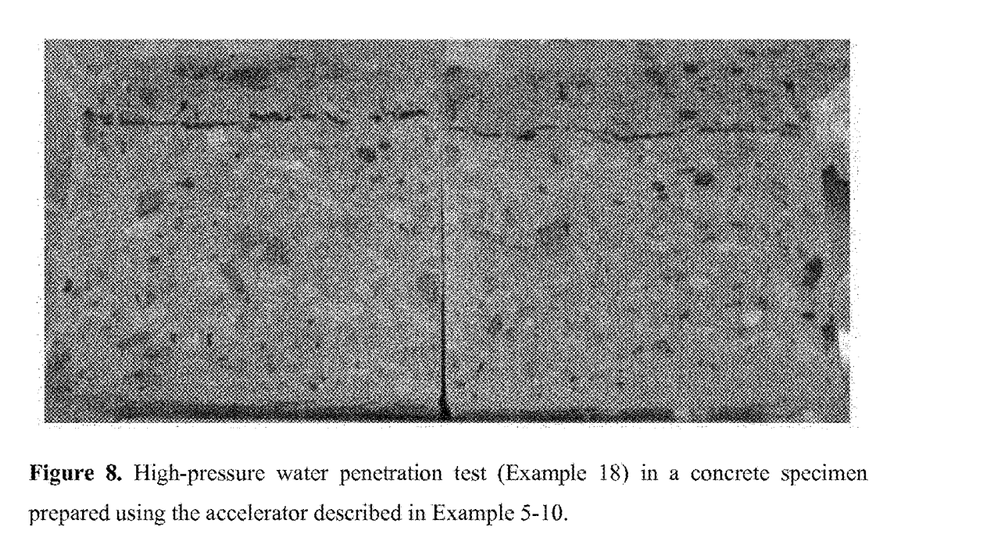
FIG. 8 shows the high-pressure water penetration test (Example 18) in a concrete specimen prepared using the accelerator described in Example 5-10.
Figure 9:
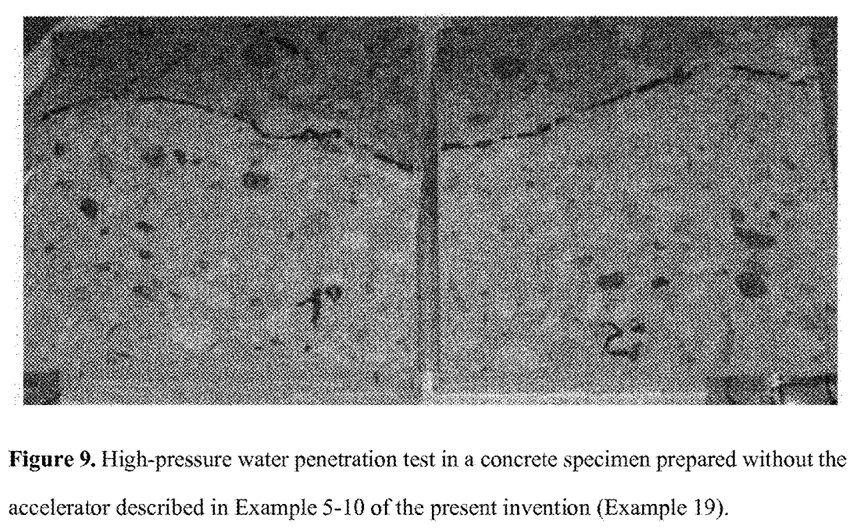
FIG. 9 shows the high-pressure water penetration test in a concrete specimen prepared without the accelerator described in Example 5-10 of the present invention (Example 19).

This example demonstrates the durability improvement of cementitious mixes achievable using the transition metal silicates. The demonstration is based on water permeability tests on concrete specimens containing the admixture in comparison to admixture-free ones. It is known that one of the major causes of degradation of cementitious structures is the penetration of aggressive chemical agents, such as dissolved sulfates and chlorides, that can cause expansion and fracturing of concrete (sulfates) or corrosion of rebar (chlorides). A reduction of the permeability of structures therefore reduces water diffusion inside the capillary porosity and contributes substantially to an improvement of durability. The permeability test was carried out, according to European norm UNI-EN 12390-8, by comparison of 15×15×15-cm cubic samples containing 3 wt % (0.68% dry content) with respect to cement of the accelerator of Example 5-10 to concrete samples without accelerators. The composition of the concrete mixes for the tests is reported in Table 12. After 28 days of curing at 20° C., 95% r.h., 5 of the 6 facets of the samples were water-proofed with a layer of epoxy resin, while a hydraulic load of 500±50 KPa was applied on the free facet for 72 hours. The weight of each specimen was determined before and after the test. The specimens were then broken apart to measure the depth of penetration of water. The test results are summarized in Table 13, while FIGS. 8 and 9 show respectively the water-penetration profiles for the specimen containing the admixture and for the reference sample without.

TABLE 12

Composition and characteristics of the concrete mix used for
the water-permeability test according to norm UNI-EN 12390-8

| | |
|---|---|
| Type of cement | CEMII A-LL |
| Cement dosage | 300 kg/m$^3$ |
| Type of filler | Limestone |
| Filler dosage | 100 kg/m$^3$ |
| Water/cement ratio W/C | 0.60 |
| Maximum aggregate diameter | 20 mm |
| Superplasticizer (0.5% dosage) | Dynamon SP1, Mapei |
| Slump class | S5 |

TABLE 13

Summary of the water-penetration test on a concrete sample
prepared using the accelerator described in Example 5-10

| | Concrete specimen | | | |
|---|---|---|---|---|
| | No admixture | | Example 5-10 | |
| Specimen n. | 1 | 2 | 1 | 2 |
| Specimen size (cm) | 15 × 15 × 15 | 15 × 15 × 15 | 15 × 15 × 15 | 15 × 15 × 15 |
| Specimen weight before test | 7973 | 7920 | 8071 | 7967 |
| Specimen weight after test | 8014 | 7945 | 8085 | 7988 |
| Water absorbance (g) | 41 | 25 | 14 | 21 |
| Absorbance (%) | 0.51 | 0.32 | 0.17 | 0.26% |
| Average (%) | 0.41 | | 0.22 | |
| Maximum depth of water penetration (mm) | 66 | 54 | 33 | 31 |
| Average (mm) | 60 | | 32 | |

The results clearly confirm the reduction of permeability of concrete specimens according to the invention compared to the admixture-free reference sample.

EXAMPLE 19

This example illustrates the use of the transition metal silicate hydrates to improve the environmental compatibility of hydraulic-binder-based systems used in solidification/stabilization processes of waste. 1,400 g of contaminated fly-ash deriving from combustion of coal and other alternative fuels for energy generation were mixed with 700 g of CEM I portland cement, 500 g of water and 35 g of an aqueous solution of superplasticizer (Dynamon SP1, Mapei S.p.A.). The fly-ash was contaminated by heavy metals and had a maximum particle diameter below 1 mm. The heavy-metal concentration in the ash is reported in Table 14. After 5 minutes of mixing, the paste was poured in a plastic mold and cured for 28 days at 20° C., 95% r.h. (reference mix).

TABLE 14

Concentration of some contaminants in the fly-ash deriving from combustion of coal and other alternative fuels

| METAL | UNIT OF MEASURE | CONCENTRATION |
| --- | --- | --- |
| Nickel | mg/kg | 7686 |
| Antimony | mg/kg | 1.08 |
| Arsenic | mg/kg | 48.60 |
| Cadmium | mg/kg | 0.46 |
| Total Chromium | mg/kg | 29.63 |
| Mercury | mg/kg | <0.1 |
| Molybdenum | mg/kg | 2980 |
| Lead | mg/kg | 18.20 |
| Copper | mg/kg | 21.48 |
| Selenium | mg/kg | <0.1 |
| Tin | mg/kg | <1 |
| Zinc | mg/kg | 104 |

Similar mixes were repeated with the addition of the accelerator of Example 5-10 at dosages of respectively 3 and 5 wt % with respect to the weight of cement. Each of the mixes was poured in its own mold for curing in the same conditions as the reference sample. After 28 days of curing, the samples were crushed and the fraction with a diameter lower than 4 mm underwent leaching tests for 24 hours in de-ionized water, according to the UNI 10802-2004 method. The leaching values of the different metals are reported in Table 15.

TABLE 15

Leaching values of the metals contained in the fraction smaller than 4 mm of the materials stabilized with cement and no admixture (reference sample) and with 3 and 5% of admixture with respect to cement weight

| | | CONCENTRAZIONE NELL'ELUATO | | |
| --- | --- | --- | --- | --- |
| METAL | UNIT OF MEASURE | REFERENCE | 3% EXMPLE 5-10 | 5% EXAMPLE 5-10 |
| Nickel | mg/L | 0.35 | 0.12 | 0.06 |
| Antimony | mg/L | 0.006 | <0.001 | <0.001 |
| Arsenic | mg/L | 0.012 | 0.009 | 0.001 |
| Cadmium | mg/L | 0.026 | 0.017 | 0.008 |
| Total Chromium | mg/L | 0.13 | 0.04 | <0.01 |
| Mercury | mg/L | <0.0005 | <0.0005 | <0.0005 |
| Molybdenum | mg/L | 3.3 | 0.86 | 0.05 |
| Lead | mg/L | 0.15 | 0.09 | <0.01 |
| Copper | mg/L | 0.35 | 0.13 | <0.05 |
| Selenium | mg/L | <0.0005 | <0.0005 | <0.005 |
| Zinc | mg/L | 0.51 | 0.12 | 0.07 |

As it is possible to notice from the results in Table 15, adding the admixture of Example 5-10 progressively reduces metal leaching out of the stabilized material with the resulting improvement of its environmental compatibility.

The invention claimed is:
1. A method of accelerating setting and hardening of hydraylic binders, said method comprising:
adding to said hydraulic binders from 0.01% to 40% with respect to the weight of the binders of a transition metal silicate hydrate having general formula

$$aMe_xO_y \cdot bMO \cdot cAl_2O_3 \cdot SiO_2 \cdot dH_2O \qquad 1)$$

where
Me represents a transition metal whose molar coefficient a is in a range between 0.001 and 2;
M represents an alkaline earth metal whose molar coefficient b is in a range between 0 and 2;
The molar coefficient c for $Al_2O_3$ is in a range between 0 and 2;
$H_2O$ represents the hydration water of the silicate hydrate whose molar coefficient d vary within a wide range between 0.5 and 20;
x and y both be equal to 1 or different, depending on the valence of the transition metal, given that the valence of the oxygen atom in the metal oxide is equal to 2
and being characterized by the presence of particles with a diameter lower than 1,000 nm,
whereby accelerating the setting and hardening of said hydraulic binders.
2. The method according to claim 1 wherein the transition metal is selected from chromium (Cr), manganese (Mn), iron (Fe), cobalt (Co), nickel (Ni), copper (Cu) and zinc (Zn).
3. The method according to claim 1 wherein the transition metal silicate hydrate is a mixed silicate hydrate with alkaline earth metals.
4. The method according to claim 3 wherein the alkaline earth metal is selected from calcium and magnesium.
5. The method according to claim 1, wherein the transition metal silicate hydrate is in the form of an aqueous suspension or a water-dispersible gel.
6. A process for the preparation of the transition metal silicate hydrate of claim 1, said method comprising:
a. a first step in which a soluble silicon-containing compound in alkaline conditions, a soluble transition-metal compound and a soluble compound of an alkaline earth metal and/or aluminum react, in alkaline conditions, to form an aqueous suspension of transition metal silicate hydrates of formula 1);

b. a second step in which the suspension obtained in a) is subjected to a mechanical treatment able to disintegrate the particles of transition metal silicate hydrate to a size smaller than 1,000 nm steps a) and b) being carried out in the presence of a water-soluble organic dispersant selected from:
i. polyethercarboxylate comb polymers, containing phosphonic and/or sulfonic groups and
ii. phosphonate derivatives of polyoxylakylenes.

7. The process according to claim 6, in which the soluble silicon-based compound in alkaline conditions is selected from sodium silicate, sodium metasilicate, microsilica, nanosilica or mixtures thereof.

8. The process according to claim 6 wherein the transition metal compounds, the aluminum and alkaline earth metal compounds are nitrates, nitrites, acetates, formates, oxides, hydroxides or mixtures thereof.

9. The process according to claim 6 wherein the polyethercarboxylate comb polymer is prepared by reaction of a polymer A with a polymer B and an amino compound C, said polymer A being prepared starting from at least one monomer (a) selected from the group of unsaturated monocarboxylic acids, unsaturated bicarboxylic acids and their mixtures and at least one ethylenically unsaturated monomer (b) selected from ethylenically unsaturated aromatic monomers, vinyl compounds, methallyl monomers, unsaturated amides or nitriles, ethylenically unsaturated compounds selected from ethylene, propylene, butylene, isobutylene, the molar ratio between monomers (a) and (b) being included in the range 100:0-20:80.

10. The process according to claim 9, in which polymer B has a polyoxyalkylene structure corresponding to the following formula $$X\text{-}(EO)_x\text{—}(PO)_y\text{—}(BuO)_z\text{—}R \qquad 2)$$

where
x, y, z are each, independently from one another, integers between 0 and 300 and x+y+z=3 or higher;
X=H, OH or NHR', where R' is an alkyl group having 1-20 carbon atoms or an arylalkyl group having 7-20 carbon atoms;
EO=ethyleneoxy, PO=propyleneoxy, BuO=butyleneoxy or isobutyleneoxy;
R is a non-reactive group towards esterification or amination.

11. The process according to claim 6 wherein the polyethercarboxylate comb polymer is prepared by copolymerization of monomers (a) and (b),
wherein monomer (a) is selected from the group of unsaturated monocarboxylic acids, unsaturated bicarboxylic acids and their mixtures and monomer (b) is selected from ethylenically unsaturated aromatic monomers, vinyl compounds, methallyl monomers, unsaturated amides or nitriles, ethylenically unsaturated compounds selected from ethylene, propylene, butylene, isobutylene, the molar ratio between monomers (a) and (b) being included in the range 100:0-20:80,
and a monomer (c) represented by an ester or amide of an α,β-unsaturated carboxylic acid of polymer B, wherein said polymer B has a polyoxyalkylene structure corresponding to the following formula $$X\text{-}(EO)_x\text{—}(PO)_y\text{—}(BuO)_z\text{—}R \qquad 2)$$

where
x, y, z are each, independently from one another, integers between 0 and 300 and x+y+z=3 or higher;
EO=ethyleneoxy, PO=propyleneoxy, BuO=butyleneoxy or isobutyleneoxy;
R is a non-reactive group towards esterification or amination, where X represents an acyl or α,β-unsaturated amido group, the molar ratio of monomers (a), (b) and (c) being included in the range (a+c):(b)=100:0-30:70 and the molar ratio of monomers (a) and (c) being included in the range (a):(c)=200:1-0.1:1.

12. The process according to claim 6 wherein the dispersants are phosphonate derivatives of polyoxyalkylenes.

13. Derivatives of polyoxylakylenes represented by the following general formula:

$$R\text{—}O(EO)_x\text{—}(PO)_y\text{—}(BuO)_z\text{—}NR'\text{—}CH_2\text{—}PO(OH)_2 \qquad 3)$$

where
x, y, z are each, independently from one another, integers between 0 and 300 and x+y+z=3 or higher;
R represents a hydrogen atom or an alkyl group with 1-20 carbon atoms;
R' represents a hydrogen atom or an alkyl group with 1-20 carbon atoms or the group —CH$_2$—PO(OH)$_2$;
EO=ethyleneoxy, PO=propyleneoxy, BuO=butyleneoxy or isobutyleneoxy.

14. The process according to claim 6 wherein the dispersants are phosphonate derivatives of polyoxyethylenes having the following general formula:

$$O\!=\!P(OX)_2\text{—}R_1\{\text{—}R_2\text{—}(R_3)_n\text{-}[AO]_q\text{—}R_4\}_m \qquad 4)$$

where
X=H or an alkaline or alkaline earth metal;
R$_1$ is an organic radical having 1-10 carbon atoms;
R$_2$ independently be a carboxyl or an amide group;
R$_3$ is an alkyl group with 1-6 carbon atoms;
R$_4$ is a hydrogen atom or an alkyl group with 1-20 carbon atoms;
Group A is independently a C2-C4 alkylene group and the index q has a value included in the range between 2 and 300, and index m vary from 1 to 4.

15. The process according to claim 6 wherein reduction of size of the particles of transition metal silicate hydrate is carried out using high-pressure homogenizing systems, rotor/stator systems, milling systems or via ultra-and nano-filtration membranes.

16. Compositions as aqueous suspension or water-dispersible gels including particles of the transition metal silicate hydrates as defined in claim 1 having size lower than 500 nm and a water-soluble organic dispersant selected from:
i. polyethercarboxylate comb polymers, containing phosphonic and/or sulfonic groups;
ii. phosphonate derivatives of polyoxyalkylenes, as defined in claim 6.

17. A method of accelerating and hardening cementitious compositions, reducing permeability, or solidifying/stabilizing processes of waste for cementitious systems based on portland cement, mixtures of portland cement and finely-ground slag or fly-ash, mixtures of calcium hydroxide with finely-ground slag, fly-ash and pozzolanas, said method comprising
adding the composition of claim 16 to said cementitious compositions.

18. The process according to claim 10, wherein said non-reactive R groups comprise C1-C4 alkyls.

19. The process according to claim 11, wherein said non-reactive R groups comprise C1-C4 alkyls.

* * * * *